United States Patent [19]

Peeples

[11] 4,274,326

[45] Jun. 23, 1981

[54] HYDRAULIC BOOSTER WITH BACK PRESSURE CONTROL

[75] Inventor: Denny L. Peeples, Dayton, Ohio

[73] Assignee: General Motors Corporation, Detroit, Mich.

[21] Appl. No.: 16,086

[22] Filed: Feb. 28, 1979

[51] Int. Cl.³ .............................................. F15B 9/10
[52] U.S. Cl. .................... 91/49; 91/369 A; 91/420; 91/431; 91/446
[58] Field of Search ................... 91/420, 431, 49, 446, 91/369 A

[56] References Cited

U.S. PATENT DOCUMENTS

| 2,674,138 | 4/1954 | Mize | 91/452 |
|---|---|---|---|
| 3,050,944 | 8/1962 | Schwartz et al. | 91/431 |
| 3,515,031 | 6/1970 | McPherson | 91/431 |
| 3,631,761 | 1/1972 | Rumsey | 91/420 |
| 3,749,112 | 7/1973 | Nishikow | 91/420 |
| 4,181,064 | 1/1980 | Flory | 91/431 |

*Primary Examiner*—Paul E. Maslousky
*Attorney, Agent, or Firm*—D. D. McGraw

[57] ABSTRACT

A hydraulic power brake system in which a hydraulic power brake booster has one or more back pressure control valves to produce a restriction downstream of the booster control valve after the booster has been actuated to build up some booster power pressure. This back pressure on the booster control valve is effective to control hydraulic valve noise during booster operation. There is substantially no fluid restriction in the booster when the booster is not actuated. Three back pressure control valve arrangements are disclosed.

3 Claims, 4 Drawing Figures

HYDRAULIC BOOSTER WITH BACK PRESSURE CONTROL

The invention relates to a hydraulic booster having a hydraulic back pressure control, and more particularly to one in which the back pressure control is actuated to create a back pressure in a controlled manner on the downstream side of the booster control valve when the booster is hydraulically pressure actuated.

A back pressure control valve is positioned fluidly intermediate the open center booster control valve controlling booster actuation and the booster hydraulic fluid outlet. In the inactive condition the back pressure control valve is open so that it provides no flow restriction downstream of the booster control valve. It has operating means sensing hydraulic fluid pressure actuation of the booster and activating the back pressure control valve to a flow restricted condition which restricts flow of hydraulic fluid downstream of the booster control valve and creates a hydraulic back pressure on the booster control valve which decreases valve noise generated by booster actuating operation of the booster control valve. The amount of flow restriction may vary with the power pressure used for booster actuation, may vary to maintain a constant back pressure, or may be a predetermined amount of flow restriction obtained at some predetermined point of booster power actuation. In some installations, two types of flow restrictions may be used in series. In others, only one type may be desired. In any event, the back pressure at the booster control valve will be substantially less than the booster actuating pressure.

In the drawings, FIG. 1 is a schematic representation of the hydraulic system incorporating a hydraulic brake booster embodying the invention:

Figure 1:
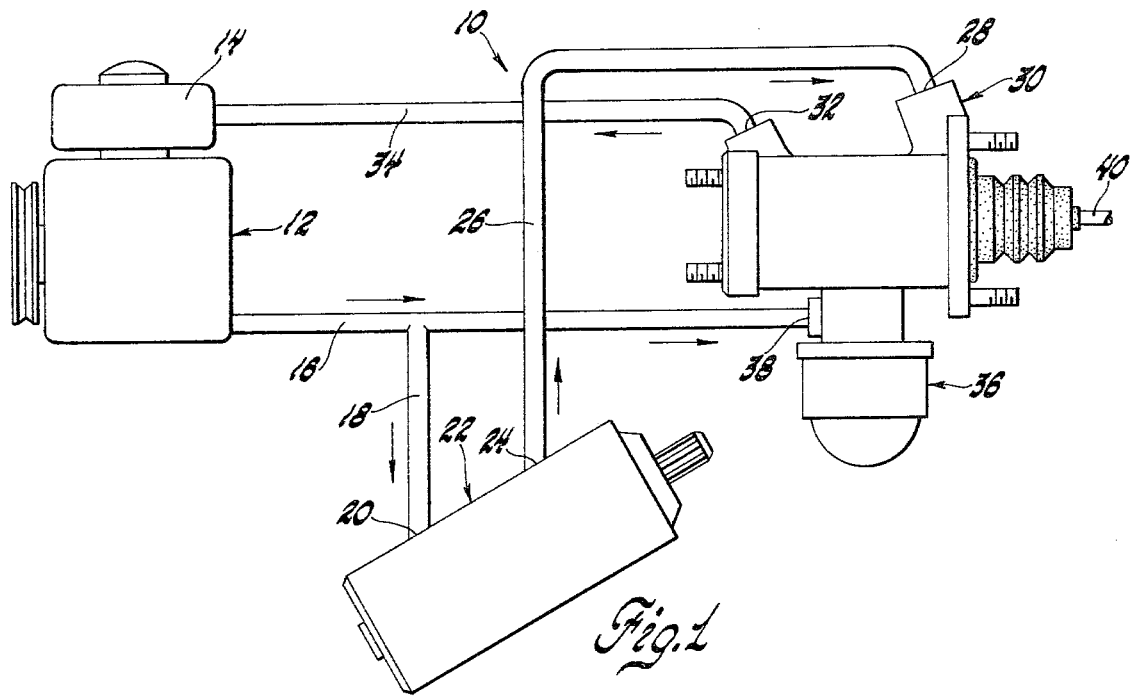

The hydraulic system 10 of FIG. 1 is illustrated as being a power steering gear and hydraulic brake booster system of the type utilized in automotive vehicles. The system includes a hydraulic pump 12 having a reservoir 14. The pump outlet conduit 16 has a conduit branch 18 connected to the inlet 20 of the power steering gear 22. The power steering gear outlet 24 is connected by conduit 26 to the inlet 28 of the hydraulic brake booster 30. The booster outlet 32 is connected by return conduit 34 to the pump reservoir 14. Booster 30 is provided with an accumulator 36 having an inlet 38 to which conduit 16 is also connected. Hydraulic fluid discharged from the pump 12 is therefore provided to the accumulator inlet 38 as well as to the power steering gear inlet 20. Booster 30 is arranged to be operated by movement of an input push rod 40 in a suitable well-known manner such as being connected to a brake pedal for operation by a vehicle operator. The booster is arranged to operate a master cylinder assembly, not shown in FIG. 1, so that when the master cylinder is actuated through the booster the vehicle brake system is pressurized and the vehicle brakes are energized.

Figure 2:
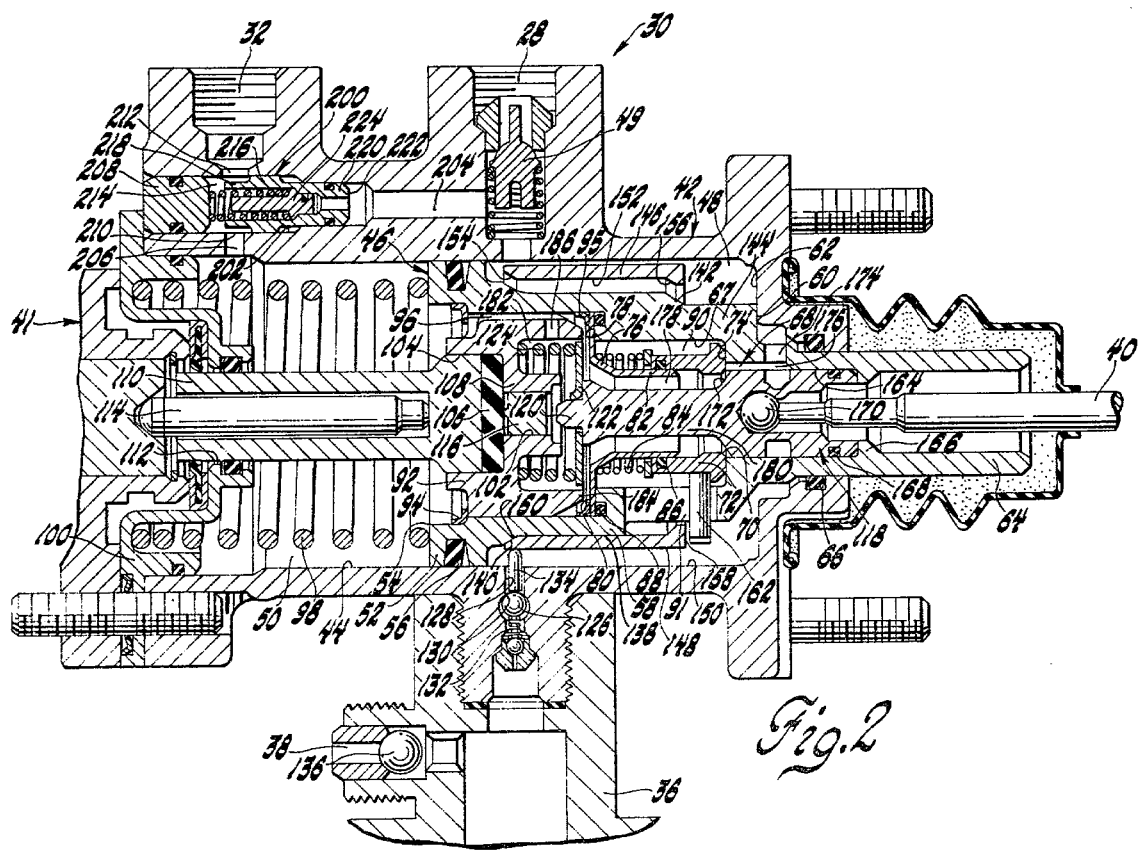
FIG. 2 is a cross sectional view of the hydraulic booster of FIG. 1 embodying the invention.

The booster 30 is illustrated in greater detail in FIG. 2 together with a part of the master cylinder 41 actuated by the booster. The booster has a housing 42 provided with a bore 44 extending through the housing. A power piston 46 is reciprocably and sealingly received in a portion of bore 44 to divide that bore into several chambers. A power chamber 48 is located in the bore at one end of power piston 46 and an exhaust chamber 50 is located in the bore at the other end of the power piston 46. Inlet 28 opens into power chamber 48 through inlet check valve 49. Outlet 32 conducts fluid from exhaust chamber 50. Power piston 46 has a land 52 at its forward end 54. Land 52 is provided with a seal 56 to seal the piston relative to the bore wall. The piston 46 has a first reduced diameter portion 58 extending rearwardly from land 52 to a shoulder 60 which abuts a wall 62 formed by a shoulder in a part of bore 44 and defining the rear wall of power pressure chamber 48. Piston 46 has a further reduced diameter portion 64 extending through wall 62 in bore 44. Seal 66 in that portion of bore 44 seals against the outer surface of piston portion 64 while allowing the piston to move axially. Power piston 46 has a bore 67 extending axially therethrough and providing fluid communication between power chamber 48 and exhaust chamber 50. An open center control valve 68 is provided in the end of bore 67 opening to power chamber 48. Valve 68 provides for control of the booster in its power operation. A valve seat 70 is mounted in bore 67 and forms a part of valve 68. A sleeve 72 is reciprocably mounted in bore 67 within piston 46 and has one end formed to define valve seat 70. The valve seat normally is in engagement with a shoulder 74 formed within bore 67 at the bore end adjacent power chamber 48. A spring seat and guide 76 is mounted within bore 67 and is seated against a shoulder 78 formed in the bore. Seat and guide 76 has a radially extending flange section 80 engaging shoulder 78 for this purpose. It also has a short cylindrical section 82 extending within a smaller diameter portion of bore 67 toward valve seat 70 so that sleeve 72 is guided thereon in axial movement. A compression spring 84 acts on sleeve 72 and takes reaction on the spring seat and guide 76 to continually urge sleeve 72 and valve seat 70 toward shoulder 74. Suitable seals 86 and 88 are provided between seat and guide 76, sleeve 72, and a portion of the piston 46 so that the chamber 90 is sealed from the exhaust chamber 50. Chamber 90 contains sleeve 72, spring 84 and spring seat and guide cylindrical portion 82. It is connected to the power chamber 48 through the opening 91 in power piston 46. The bore 67 of the power piston 46 has an enlarged forward end containing a reaction housing 92 held in place by a suitable stop 94. Housing 92 is urged into engagement with stop 94 when the booster is inactive by control valve spring 124, as will be further described. A retainer 95 holds the seat and guide 76 in position against shoulder 78. A passage 96, formed by an axially extending groove in the outer surface of housing 92, forms a part of the exhaust chamber 50. A piston return spring 98 is contained in exhaust chamber 50 and urges the power piston toward the power chamber 48. The forward end of bore 44 is closed by an end wall and spring seat 100, against which spring 98 is seated. Reaction housing 92 has a bore 102 extending axially therethrough, with the forward, larger bore portion 104 having a reaction disc 106 received therein and abutting the bore shoulder 108. A reaction plunger 110 is contained in bore portion 104 and extends forwardly and out of the power piston 46. The rear surface of plunger 110 engages the entire forward surface of reaction disc 106. Plunger 110 extends through a sealed opening 112 formed axially in the end wall 100 and also contains an output member 114 which is arranged to actuate the master cylinder assembly 41. The portion of bore 102 rearwardly of shoulder 108 is of smaller diameter than bore portion 104. A reaction piston 116 is reciprocably mounted in this bore portion and has a forward surface engageable with the center part of the rearward surface of the reaction disc 106. An input valve member 118, to be described in greater detail below, extends through the valve seat 70 and sleeve 72. The input valve member output end 120 extends into the rear portion of bore 102 so that it is engageable with reaction piston 116. A spring seat 122 is positioned on a shoulder formed on the input valve member 118 adjacent to but rearwardly of its output end 120, and provides a seat for a spring 124 which takes reaction on the rearward side of reaction housing 92. Spring 124 therefore continually urges the input valve member 118 rearwardly or rightwardly as seen in FIG. 2, and also continually urges the reaction housing 92 toward its stop 94.

An accumulator control valve 126 is positioned in a passage 128 formed in housing 42 so that the passage extends radially inwardly into the forward portion of chamber 48 near power piston land 52. A valve seat 130 is provided for valve 126 in passage 128 and the valve is spring loaded by spring 132 to normally engage its seat. Accumulator pressure will act on the valve 126 to assist in keeping the valve closed against its seat. Valve 126 has a valve operating plunger 134 extending through passage 128 and into chamber 48 and having radial clearance relative to the passage wall so as to permit fluid flow through passage 128 past plunger 134. The accumulator charging pressure inlet 38 has a check valve 136 therein which will open to admit pressure from pump 12 only when the pump output pressure is sufficient to open check valve 136 against the pressure in the accumulator. Check valve 136 will close to prevent hydraulic fluid from flowing from the accumulator outwardly through inlet 38.

The power piston reduced diameter portion 58 has a cylindrical outer surface 138 with an outer peripheral annular ramp 140 at the surface forward end adjacent land 52 and another outer peripheral annular ramp 142 at the surface rear end. Ramp 142 adjoins another power piston reduced diameter portion 144 of somewhat smaller diameter than porton 158 and connecting ramp 142 and shoulder 60. A cylindrical cam 146 is received about power piston portion 58 and ramps 140 and 142. Cam 146 has an outer peripheral surface 148 of lesser diameter than the bore section 150 of bore 44 in which piston land 52 is received and of which power pressure chamber 48 forms a part. Cam 146 has an inner peripheral surface 152 of greater diameter than the part of power piston portion 58 that is between ramps 140 and 142. The cam surface 152 terminates at its forward end with an outwardly inclined inner peripheral ramp 154 which is positioned radially outward of ramp 140 and is mateable therewith. The rear end of cam surface 152 terminates with an inwardly inclined inner peripheral ramp 156 which is positioned radially outward of ramp 142 and is mateable therewith. The rear end of cam 146 has an annular end surface 158.

Cam 146 can move radially relative to power piston 46 so as to have its cam axis parallel to but spaced from the power piston axis. Cam 146 can also move axially relative to power piston 46. Accumulator pressure control valve plunger 134 is spring loaded into engagement with the cam outer surface 148 by the force of spring 132 so that the cam is urged radially toward displacement of its axis from the axis of power piston 46, as shown in FIG. 2. This causes point or line engagement of the mateable surfaces of ramps 140 and 154, as shown at 160, and of the mateable surfaces of ramps 142 and 156. The camming action of these ramps insures that cam 146 has moved rearwardly and radially relative to power piston 46 so that the piston surface 138 and cam surface 152 are at least close together, and may be in engagement, along an axially extending line of close approach located on the same circumferential portion of the cam 146 as the location of point or line engagement of the ramps. This is illustrated at the bottom portions of piston 46 and cam 146 in FIG. 2. It occurs in line with the point of engagement of cam 146 and plunger 134, particularly when plunger 134 extends radially towards the axis of the power piston 46. This causes the diametrically opposite sides of cam 146, piston surface 138, and ramps 140, 142, 154 and 156 to be radially spaced apart for a substantial distance as illustrated at the top portions of piston 46 and cam 146 in FIG. 2. A pin 162 extends through piston opening 91 and is secured to valve seat sleeve 72 so as to be axially movable therewith in opening 91. Pin 162 is engageable with cam end surface 158.

The input valve member 118 is reciprocably received in bore section 164 of bore 67 of power piston 46. A suitable stop 166 is provided to determine the released position of member 118, as shown in FIG. 2. A seal 168 on the rear part of member 118 seals with the wall of bore section 164. Member 118 has a ball and socket connection 170 with input push rod 40 so that the member 118 may be moved by the push rod. A valve input element 172 formed on an outer peripheral part of member 118 provides a part of booster control valve 68 and co-operates with valve seat element 70. One or more cross passages 174 in power piston 46 located axially between shoulders 60 and seal 66, and a short axial passage 176, conduct hydraulic fluid to valve 68 and are a part of power chamber 48. Annular passage 178, formed by sleeve 72 and spring seat and guide 76 and the portion 180 of member 118 forward of valve of input element 172, opens into a chamber 182, formed by a recess in the rear end of reaction housing 92, and connects with passage 96 and exhaust chamber 60, effectively forming a part of that exhaust chamber.

Chamber 182 is illustrated as having two fluid paths connecting it with passage 96. One is past the rear end 184 of reaction housing 92, and the other is through a passage 186 formed in reaction housing 92. As is more easily seen in FIG. 3, the reaction housing rear end 184 is provided with a notch 188 which will form a restrictive flow path from chamber 182 when housing end 184 engages flange 80. This engagement occurs when power pressure in chamber 48 moves power piston 46 leftwardly with a leftward, actuating movement of input valve member 118 after overcoming spring 124. Therefore, power piston 46 acting in response to power pressure is the operating means for the back pressure valve formed by passage 186 and notch 188. The some installations, notch 188 may be so sized that it provides all of the desired restrictive flow. Passage 186 may therefore be omitted. In other installations, passage 186 may be provided concurrently with notch 188, or passage 186 may be provided without notch 188. Irrespective of the particular restriction or restrictions used, this arrangement establishes a fixed flow restriction which causes a back pressure in chamber 182 and passage 178 to the downstream side of booster control valve 68.

Back pressure on valve 68 has proven to be effective in controlling hydraulic valve noise.

Figure 3:
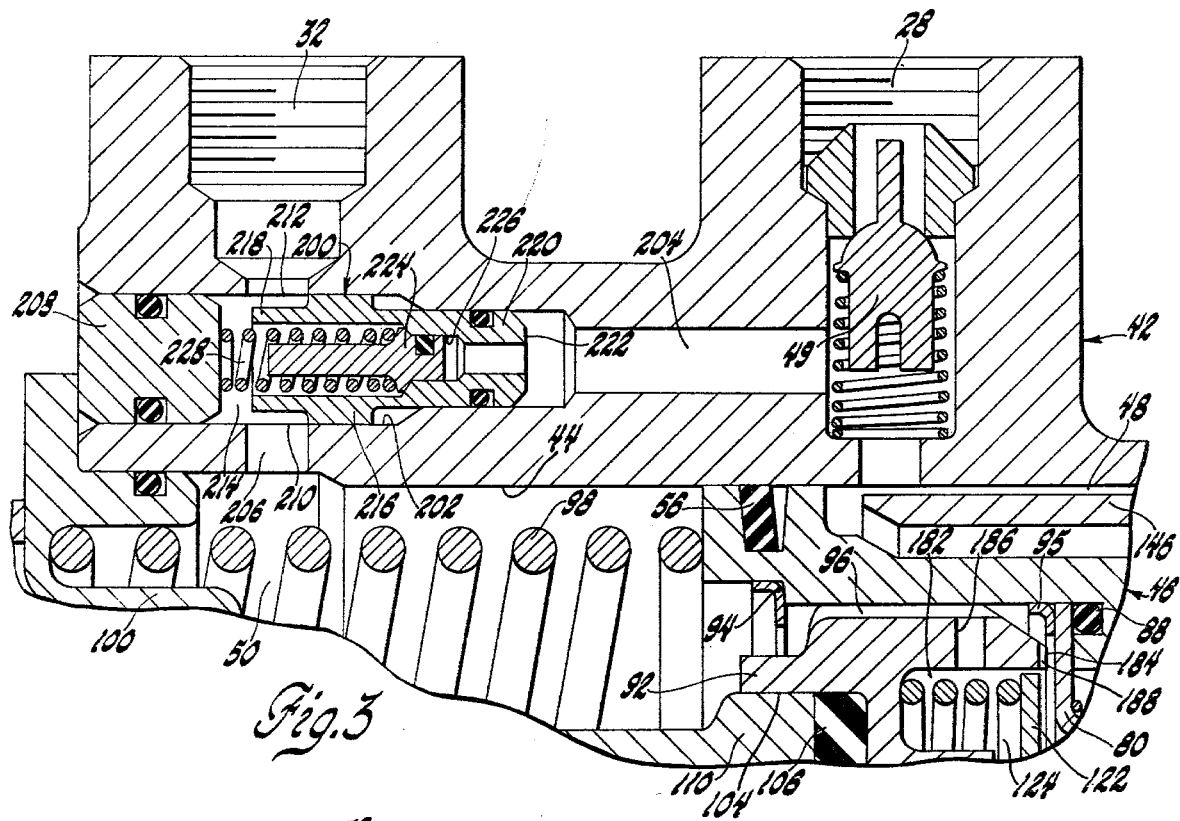
FIG. 3 is an enlarged cross section view of a portion of the booster of FIG. 2, with parts broken away.

The booster in FIG. 2 is shown with another back pressure control valve 200, also shown in greater detail in FIG. 3. Valve 200 may be used with the valve arrangement setting up flow restriction through notch 188, or passage 186, as above described, or may be used in lieu of such an arrangement by providing for substantially non-restrictive flow from chamber 182 to passage 96 in all conditions of booster operation. Valve 200 is reciprocably mounted in a bore 202 formed in a passage 204 fluid connecting power chamber 48 and inlet 28, downstream of check valve 49, with a passage 206 provided to fluid connect exhaust chamber 50 and outlet 32. Passage 206 intersects bore 202 adjacent the bore end which is closed by bore plug 208. Openings or ports 210 and 212 are formed by passage 206 where that passage opens through the bore side wall. Valve 200, bore plug 208 and the side wall of bore 202 cooperate to define a chamber 214. The land 216 of valve 200 can partially close ports 210, 212 upon leftward movement of valve 200 tending to decrease the size of chamber 214, creating a back pressure in exhaust chamber 50, passage 96, chamber 182, and passage 178 to the downstream side of booster control valve 68. The reduced diameter end 218 of valve 200 will engage plug 208 and prevent the valve land from completely closing ports 210 and 212. This limits the available restrictive action. The end 220 of valve 200 extends into a smaller diameter portion of bore 202 and has its end surface exposed to pressure in the power chamber 48. This pressure is the power pressure actuating the booster and, acting with and across the end surface of valve end 220, provides the operating means 222 of valve 200. A pressure relief valve 224 is provided in a bore 226 formed through valve 200. Spring 228 is contained in chamber 214 and acts on pressure relief valve 224 and through that valve on valve 200. Spring 228 urges the pressure relief valve closed and the valve 200 open. The force of spring 228 must be overcome by the power pressure acting across the valve end 220 to move valve 200 to the left as seen in the drawings. The amount of restriction of ports 210 and 212 varies with the power pressure until valve end 218 engages plug 208. Pressure relief valve 224 opens at the maximum desired power pressure, bypassing fluid from inlet 28 to outlet 32.

Figure 4:
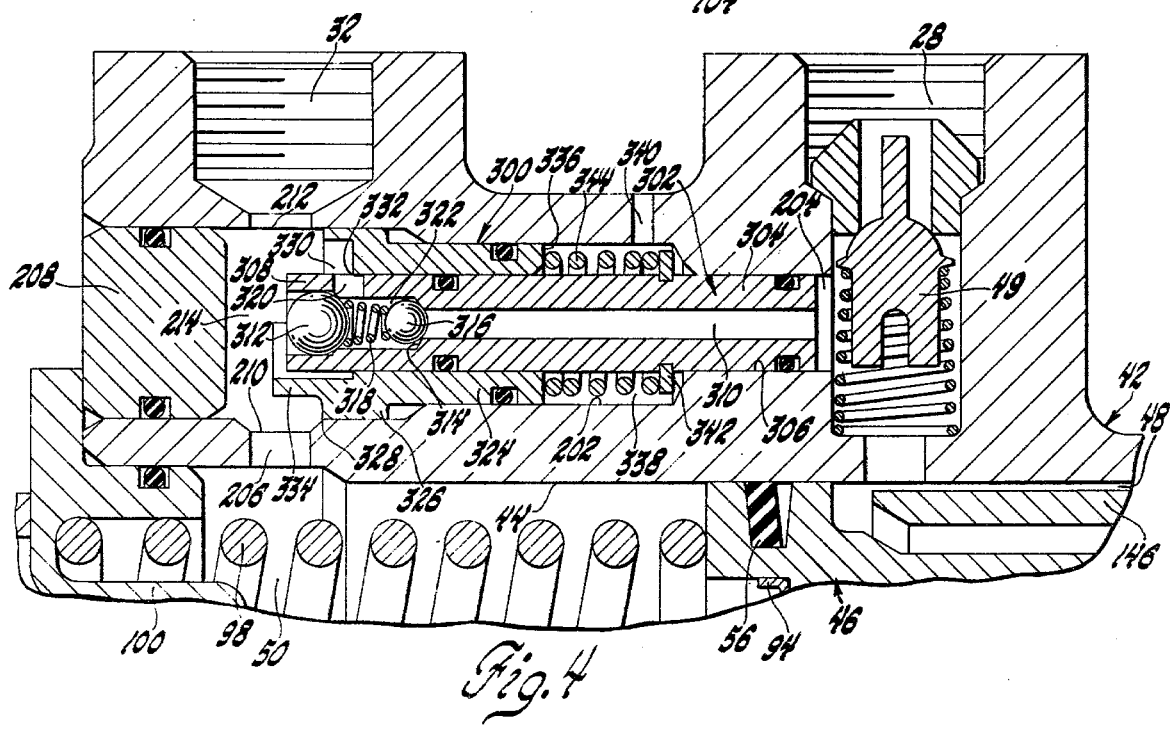
FIG. 4 is similar to FIG. 3 but showing a modified back pressure control valve arrangement.

FIG. 4 shows a modified back pressure control valve arrangement which maintains a constant back pressure on the downstream side of the booster control valve 68. Valve 300 is reciprocably mounted inn bore 202 of passage 204. As in FIG. 3, passage 204 provides a fluid connection from the power chamber 48 with a passage 206 provided to fluid connect exhaust chamber 50 and outlet 32. Passage 206 intersects bore 202 adjacent the bore end which is closed by bore plug 208. Ports 210 and 212 are formed by passage 206 where that passage opens through the bore side wall. Valve 300, bore plug 208 and the side wall of bore 202 cooperate to define a chamber 214. Valve 300 includes a piston 302, one end 304 of which is reciprocably and sealingly received in a smaller diameter portion 306 of bore 202. The other end 308 of piston 202 extends into chamber 214 and forms a part of a wall of that chamber. Piston 302 has a bore 310 extending axially therethrough and having a plug 312 in the axial end of the bore which opens through end 308. Bore 310 is formed to provide a valve seat 314 for pressure relief valve 316. Valve 316 is urged to the closed position by a valve spring 318, one end of which reacts against plug 312. A side passage 320 provides constant fluid communication between the chamber 322 formed by the end of bore 310 between valve seat 314 and plug 312, and the outer surface of piston 302. Valve 300 also includes a piston 324 reciprocably and sealingly received in the enlarged portion of bore 202 and receiving piston 302 therethrough in sealing and reciprocal relation. Piston 324 has a land 326 received in the largest portion of bore 202 forming chamber 214. Land 326 has an edge 328 which is positioned to completely clear ports 210 and 212 when the valve is in the inactive position shown in FIG. 4. A recess 330 formed in a portion of land 328 has an edge 332 which can control the amount of fluid communication from chamber 322 to chamber 214 through passage 320. Piston 324 has a reduced diameter end section 334 which may abut plug 208 to control the amount of fluid restriction that can be caused by the movement of land 326 to partially restrict ports 210 and 212. The other end 336 of piston 324 is exposed to atmospheric pressure in a chamber 338 defined by a part of bore 202, piston 302 and piston end 336. Chamber 338 is vented to atmosphere through vent 340. A spring retainer 342 is mounted in a groove formed in a portion of piston 302 so that the spring retainer is within chamber 338. A compression spring 344 is contained within chamber 338 and has one end abutting spring retainer 342 and the other end abutting piston end 336. Spring 344 is at its free length when the valve is in the inactive position illustrated in FIG. 4.

The effective area of piston 324 facing chamber 214 is so sized that the force generated by the system's minimum normal back pressure acting on the piston will overcome friction forces and move piston 324 to the position shown in FIG. 4. This will also cause piston 302 to assume the position illustrated. When the booster control valve 68 is actuated and power pressure is building up in power chamber 48, the pressure will act across the end 304 of piston 202, moving that piston to the left until it stops against plug 208. This loads spring 344 and forces piston 324 to the left, causing the ports 210 and 212 to be restricted. This restriction builds up a back pressure working on the effective area of piston 324 facing chamber 214 to a constant pressure based upon the load on spring 344. This maintains a constant back pressure on the downstream side of the booster control valve 68. Pressure relief valve 316 is sensitive to power pressure in power chamber 48 and will open to bypass pressurized fluid from inlet 28 to outlet 32 when the predetermined maximum power pressure in the booster power chamber is reached.

In the booster released position illustrated in FIG. 2, pump 12 circulates hydraulic fluid through the power steering gear 22 and the booster 30, returning the fluid to the pump reservoir 14 with little pressure in the system. When the power steering gear 22 is actuated a back pressure is generated in conduit 16 and conduit branch 18 so that the pump 12 generates hydraulic pressure. This pressure is also transmitted to the accumulator inlet 38 and opens the check valve 136 to charge the accumulator with pressure. Thus the accumulator 36 may be charged by operation of the power steering gear 22.

When the pump 12 is circulating low pressure hydraulic fluid through the system and the brake booster is actuated to operate the vehicle brakes, input push rod 40 is moved leftwardly as seen in the drawing by the vehicle operator through a brake pedal, not shown. This causes input member 118 to move forwardly, and valve input element 172 approaches and may engage valve seat element 70. This restricts or closes the hydraulic fluid flow path between power pressure chamber 48 and exhaust chamber 50, causing a back pressure to be generated in power pressure chamber 48. This pressure is normally provided by pump 12. It will be noted that the amount of pressure capable of being generated in power pressure chamber 48 is limited by action of the pressure relief valve 224 or 316, which opens to bypass fluid from inlet 28 to outlet 32 when a predetermined pressure value has been reached in chamber 48. The power pressure in chamber 48 acts against the rear side of the power piston 46, moving that piston leftwardly against the force of piston return spring 98, and also acting through the reaction housing 92, reaction disc 106, reaction plunger 110 and output member 114 to drive the master cylinder, not shown. The forward end 120 of member 118 also engages reaction piston 116 so as to receive a reaction force from the reaction disc 106 and transmit it to the vehicle operator through the push rod 40 and brake pedal. The back pressure control valve or valves described above in detail are then actuated as set forth above to create a back pressure on the downstream side of the booster control valve 68.

The embodiments of the invention in which an exclusive property or privilege is claimed are defined as follows:

1. In an open center hydraulic booster having a hydraulic fluid inlet and a hydraulic fluid outlet, a power piston having a power chamber on one side connected to said inlet and an exhaust chamber on the other side connected to said outlet, an open center control valve means permitting hydraulic fluid flow from said power chamber to said exhaust chamber and operable to actuate said booster by restricting or preventing said flow to cause hydraulic power pressure to be impressed in said power chamber, the improvement comprising:

a back pressure control valve positioned fluidly intermediate said open center control valve means and said fluid outlet and having an inactive condition providing substantially no flow restriction downstream of said open center control valve means, said back pressure control valve comprising a valve piston reciprocably movable in a bore operatively connecting said fluid inlet and said fluid outlet, a port forming a part of said fluid outlet and positioned to be restricted by said valve piston in accordance with movement of said valve piston toward said fluid outlet in response to booster actuating pressure in said fluid inlet acting thereon, said valve piston restricting flow of hydraulic fluid downstream of said open center control valve means and creating a hydraulic back pressure on said open center control valve means which is substantially less than the booster actuating pressure in said fluid inlet and said power chamber and which decreases valve noise generated by booster actuating operation of said open center control valve means, said valve piston having a bore therethrough with a valve seat formed therein, and a spring loaded, normally closed, pressure relief valve in said valve piston bore cooperating with said valve seat and responsive to a predetermined maximum booster actuating pressure at said fluid inlet to open and bypass hydraulic fluid from said fluid inlet to said fluid outlet to limit booster actuating pressure to said predetermined maximum pressure.

2. In an open center hydraulic booster having a hydraulic fluid inlet and a hydraulic fluid outlet, a power piston having a power chamber on one side connected to said inlet and an exhaust chamber on the other side connected to said outlet, and open center control valve means permitting fluid flow from said power chamber to said exhaust chamber and operable to actuate said booster by restricting or preventing said flow to cause power pressure to be impressed in said power chamber, the improvement comprising:

a back pressure control valve positioned fluidly intermediate said open center control valve means and said fluid outlet and having an inactive condition providing substantially no flow restriction downstream of said open center control valve means, said back pressure control valve comprising a bore having a bore wall and operatively connecting said power chamber and said fluid outlet, said bore being stepped to provide a small diameter first bore section at the one bore end operatively opening into said power chamber and a second bore section defined by an intermediate diameter bore section and a larger diameter third bore section at the other bore end operatively opening into said fluid outlet, a reciprocable first piston having a land reciprocably disposed in said third bore section and a piston body sealingly and reciprocably disposed in said second bore section, said first piston having a bore therethrough, a reciprocable second piston received in said first bore section and extending sealingly and reciprocably through said first piston bore, selectively loaded spring means in said second bore section acting when loaded on said first piston urging said first piston toward the other bore end and acting when loaded on said second piston urging said second piston toward the one bore end, and port means through said bore wall providing continuous flow communication from said exhaust chamber to said fluid outlet, said port means being adapted to be restricted but not closed by said first piston land when said brake pressure control valve is activated, said second piston having an area responsive to hydraulic power pressure in said power chamber to move said second piston toward the other bore end and load said spring means and move said first piston to restrict hydraulic fluid flow from said exhaust chamber to said fluid outlet by partial closure of said port means, causing a back pressure to be generated downstream of said open center control valve means acting to decrease valve operating noise of said open center control valve means and acting on said first valve to tend to move said first valve toward the one bore end so that the restriction of hydraulic fluid flow by said first piston is controlled to maintain a substantially constant back pressure value during power booster power operation.

3. In an open center hydraulic booster having a hydraulic fluid inlet and a hydraulic fluid outlet, a power piston having a power chamber on one side connected to said inlet and an exhaust chamber on the other side connected to said outlet, an open center control valve means permitting hydraulic fluid flow from said power chamber to said exhaust chamber through said open center valve means and operable to actuate said booster by restricting or preventing said flow to cause hydraulic power pressure to be impressed in said power chamber, the improvement comprising:

back pressure control valve means positioned fluidly intermediate said open center control valve means and said fluid outlet, said back pressure control valve means having an inactive condition providing substantially no hydraulic fluid flow restriction downstream of said open center control valve means, and operating means defined at least in part by said power piston and movable therewith and by actuating movement of said power piston sensing hydraulic fluid pressure actuation of said booster and activating said back pressure control valve means to a flow restrictive condition which restricts flow of hydraulic fluid within said booster downstream of said open center control valve means and creates a hydraulic back pressure in at least a portion of said exhaust chamber acting on said open center control valve means which decreases valve noise generated by booster actuating operation of said open center control valve means, said hydraulic back pressure being less than said hydraulic power pressure in said power chamber.

* * * * *

UNITED STATES PATENT AND TRADEMARK OFFICE
CERTIFICATE OF CORRECTION

PATENT NO. : 4,274,326
DATED : June 23, 1981
INVENTOR(S) : Denny L. Peeples

It is certified that error appears in the above—identified patent and that said Letters Patent is hereby corrected as shown below:

Column 4, line 59, "The some" should read -- In some --

Column 5, line 50, "inn" should read -- in --.

Column 8, claim 2, line 40, "flow" should read -- fluid --.

Signed and Sealed this

Twenty-second Day of September 1981

[SEAL]

Attest:

Attesting Officer

GERALD J. MOSSINGHOFF

Commissioner of Patents and Trademarks